April 22, 1947.  E. W. AUSTIN  2,419,308
VEHICLE FOR EXPLODING LAND MINES AND FOR TAMPING GROUND
Filed Jan. 7, 1944   4 Sheets-Sheet 1
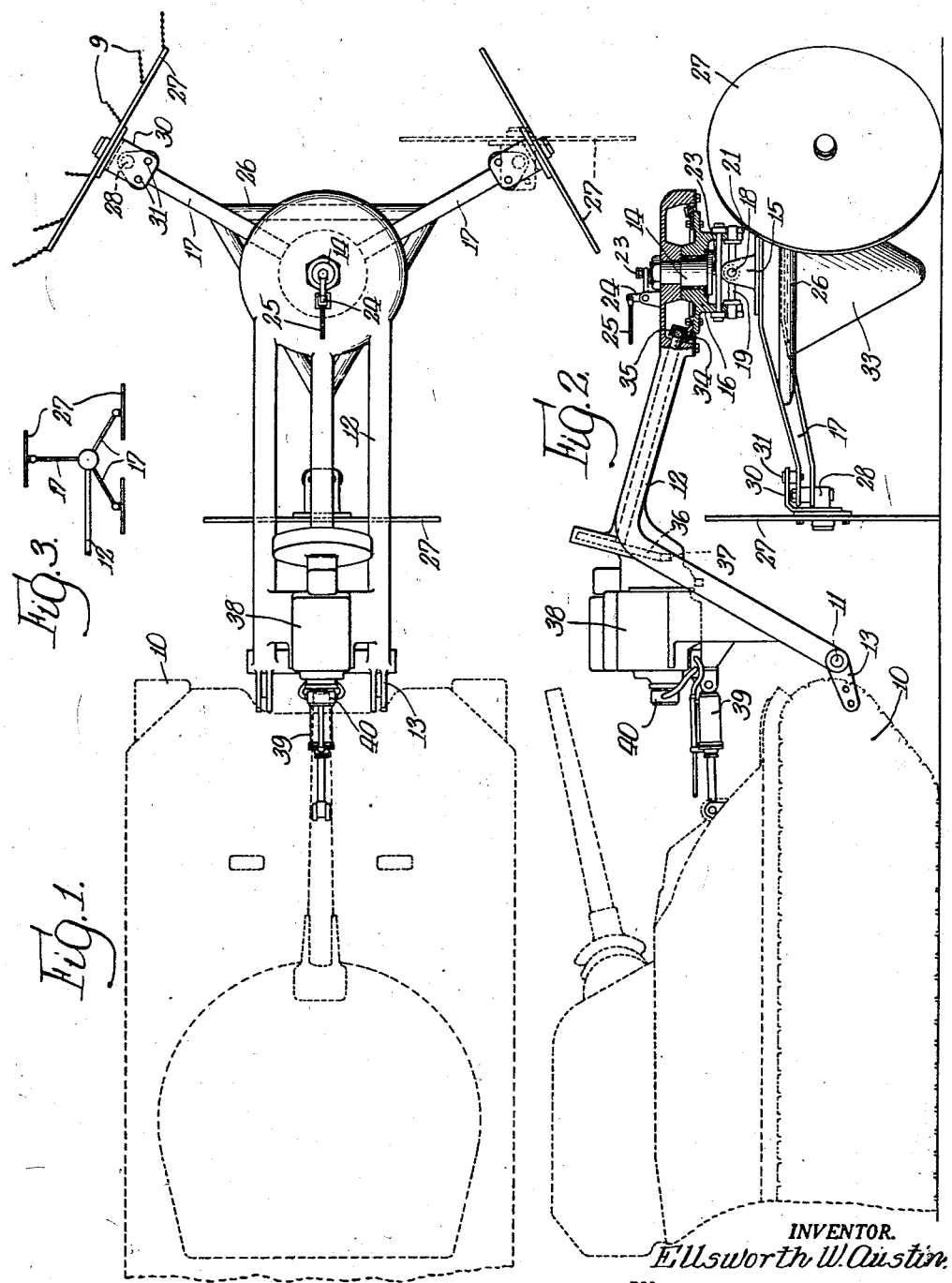
INVENTOR.
Ellsworth W. Austin.
BY Bair & Freeman
Attys

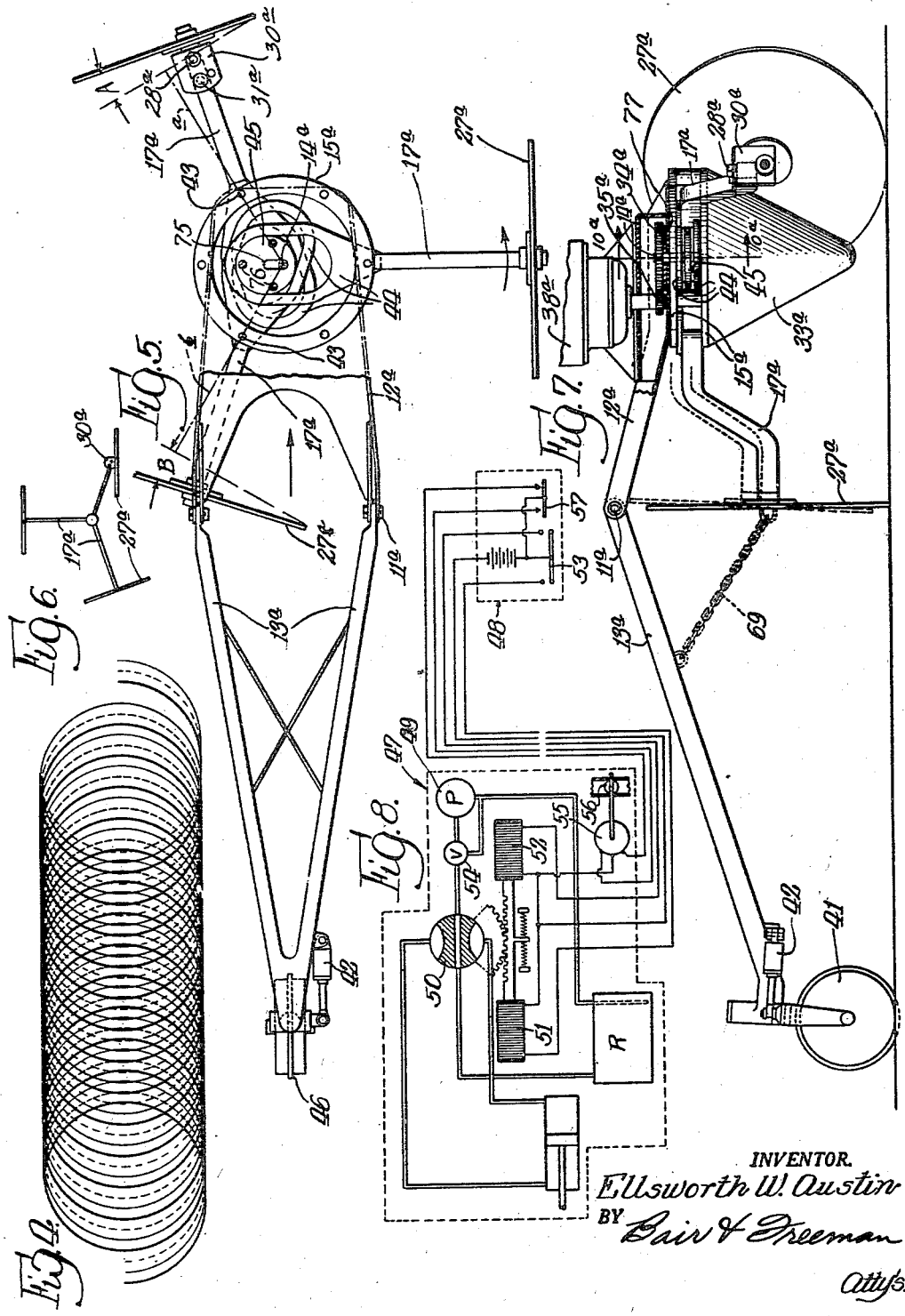

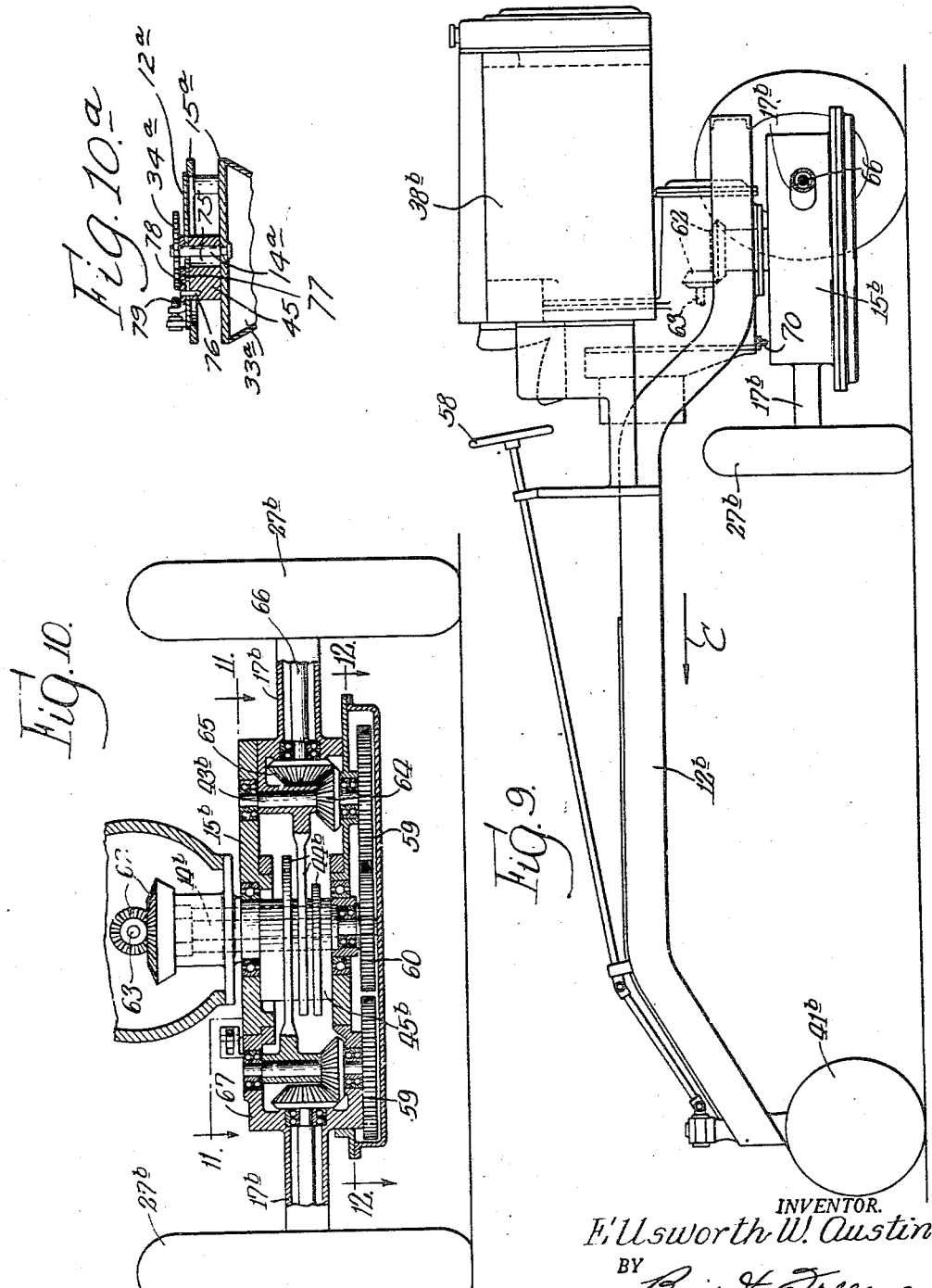

April 22, 1947. E. W. AUSTIN 2,419,308
VEHICLE FOR EXPLODING LAND MINES AND FOR TAMPING GROUND
Filed Jan. 7, 1944 4 Sheets-Sheet 4
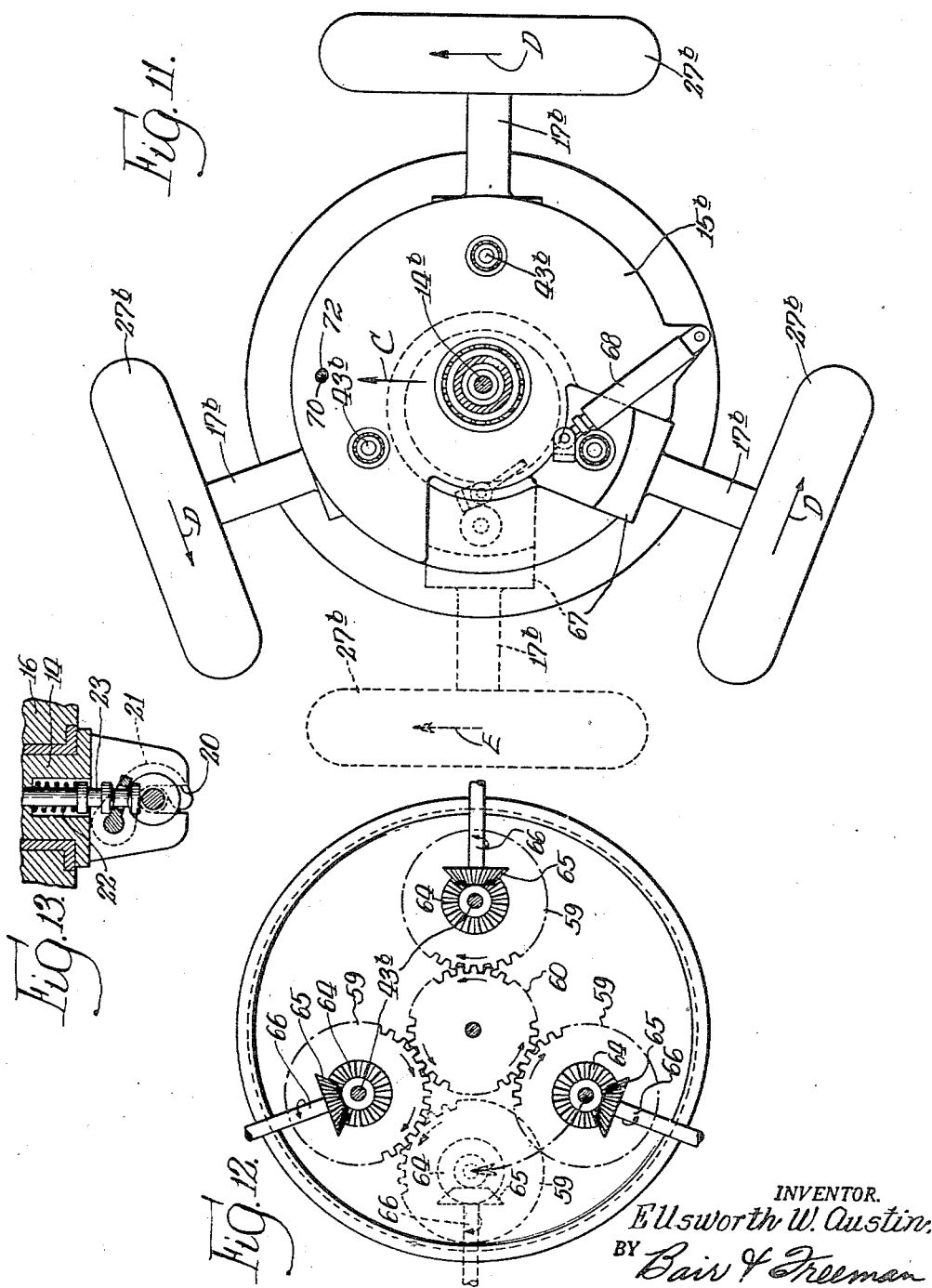

Patented Apr. 22, 1947

2,419,308

UNITED STATES PATENT OFFICE 2,419,308

VEHICLE FOR EXPLODING LAND MINES AND FOR TAMPING GROUND

Ellsworth W. Austin, Cedar Rapids, Iowa, assignor to La Plant-Choate Manufacturing Co., Inc., Cedar Rapids, Iowa, a corporation of Delaware Application January 7, 1944, Serial No. 517,333

19 Claims. (Cl. 97—43)

My present invention relates to a vehicle which is particularly adapted as a land mine sweeper, although it has other uses for both war and peacetime, such as for tamping roadways, airplane runways and the like.

One object of the invention is to provide a vehicle which includes a rotor supported by wheels or discs so that the rotor may rotate and at the same time be advanced in a straight line, thus effecting a coverage of the ground surface by wheels or discs over substantially an entire area, the sides of which are defined by the outer limits of rotation of the wheels or discs.

A further object is to provide a vehicle of this type which may have wheels for merely tamping a strip of ground or relatively thin discs for passing over the ground surface and setting off land mines due to the weight of the vehicle and its discs, particularly "tank" mines.

A further object is to provide a land mine sweeper having large and thin but heavy discs mounted in vertical planes so that tank mines and the like can be exploded by the weight of the vehicle thereon without damage to the vehicle, as mines of this character usually explode in an upward direction and therefore objects carried upwardly by the explosion can pass the discs without harming them in any way.

Still a further object is to provide a vehicle so designed that other parts thereof likewise are not harmed by the exploding mines, there being a minimum of supporting elements extending from the discs to the frame of the vehicle and spaced well above the ground surface, and a guard cone for the central portion of the rotor to deflect outwardly any dirt, rocks and the like thrown upwardly by the exploding mine.

Another object is to provide different forms of the invention wherein the vehicle is self-propelled or may be propelled by another vehicle such as a tank, both forms of the invention, however, effecting a substantially complete coverage of the ground surface for the purpose of exploding any mines along the path traveled by the vehicle, and thus effectively clearing a path for vehicles and troops to travel along without danger of being blown up by mines.

Still another object is to provide one form of the mine sweeper which is self-propelled and may be remotely controlled from another or control vehicle some distance back of the mine sweeper vehicle to prevent the control vehicle from being blown up by a "booby trap" type of mine.

Still another object is to provide one form of the invention adaptable for use as either a road grader or tamper, this form having means to drive the wheels which support the rotor and to adjust them for either rotary tamping operation or straight-away travel as desired.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of one form of my vehicle showing it mounted on a tank.

Figure 2 is a side elevation thereof with parts shown in section to illustrate details.

Figure 3 is a digrammatic view showing one adjustment of the vehicle for the purpose of transporting it.

Figure 4 is a travel pattern of the vehicle traced by the three supporting wheels or discs thereof.

Figure 5 is a plan view of a modified construction of the vehicle which in this case is self-propelled.

Figure 6 is a diagrammatic view showing an adjustment of one wheel of the vehicle of Figure 5 for transportation purposes.

Figure 7 is a side elevation of Figure 5 with certain parts thereof shown in section.

Figure 8 is an electro-hydraulic diagram showing a remote control arrangement for the vehicle of Figures 5 and 7.

Figure 9 is a side elevation of another modified form of the invention showing it applied as a combined road maintainer and tamping vehicle.

Figure 10 is a sectional view through the gearbox of Figure 9 to show operating connections between the parts.

Figure 10a is a section on the line 10a—10a of Figure 7.

Figure 11 is a plan view of Figure 10 on the section line 11—11 thereof.

Figure 12 is a sectional view taken on the line 12—12 of Figure 10 to show further details of the gearing connections; and Figure 13 is a detail of a releasing device for the vehicle shown in Figure 2.

On the accompanying drawings I have used the reference numeral 10 to indicate a suitable vehicle such as an army tank or the like which may be used for propelling a vehicle which is shown in solid lines and constitutes the subject matter of my present invention.

My vehicle includes a frame 12 which may be pivoted at 11 to brackets 13 attached to the tank 10. The frame 12 carries a rotor which is adapted to rotate on a substantially vertical stud 14 of the frame. The rotor includes a bracket 16 journaled on the stud 14 and a frame-work universally pivoted thereto and including three radial arms 17. A bracket 15 at the center of the arms carries a pair of cross pins 18 and 19 connected to form an X which constitutes a universal joint.

The pin 19 is releasably connected with the bracket 16 by being receivable in slots 20 thereof as shown in Figure 13, and normally held in such slots by hooks 21. The hooks 21 are normally held in engagement with the cross-pin 19 by a spring 22 surrounding an actuating stem 23. When the stem is raised it will obviously release the hooks 21. For raising the stem, a bell crank 24 and a control cable 25 are provided. The cable 25 may extend to a convenient position in the tank 10 for convenience of the tank operator in effecting a releasing operation for a purpose which will hereinafter appear.

The arms 17 are braced by braces 26 and are supported at their outer ends by wheels or discs 27 journaled thereon. Each of these discs may be provided with chains 9 if desired, only one disc in Figure 1 being illustrated as having them. The manner of journaling may be on brackets 28 which are provided with perforated arms 30 to be bolted in different positions by bolts 31 as shown in Figures 1 and 3 respectively, their normal positions being shown by full lines in Figure 1.

The rotor may be protected at its center by a cone-shaped guard 33 formed of sheet steel. The rotor is rotated by a bevel gear 34 attached to the bracket 16 and in turn driven by a bevel pinion 35. The pinion 35 is driven through a bevel gear 36 and a bevel pinion 37 from an engine 38 which may be of Diesel or internal combustion type. The motor 38 may be supported in any convenient position, preferably outside of the outline of the rotor as on the frame 12 as shown in Figures 1 and 2.

During operation of the mine sweeper, the frame 12 is free to permit the discs 27 to follow the contour of the ground, the universal joint at 18—19 providing the required flexibility for this purpose. The frame 12 and the rotor may be lifted, when it is desirable to transport the mine sweeper without rotating the rotor. A hydraulic jack 39 is shown for this purpose and it may be actuated by oil pressure from an oil pump 40 on the engine 38 in the usual manner common in the operation of bulldozers and the like. The jack 39 may obviously be controlled from inside the tank 10 by a remote valve or other suitable arrangement.

In Figure 7 I show a modified construction wherein, in place of the frame 12, a jointed frame is provided comprising parts 12ª and 13ª. The joint between them is shown at 11ª. In this form of vehicle, the frame member 13ª has a steerable wheel 41 thereon, and a hydraulic actuator 42 of piston and cylinder type is provided for operating the steerable wheel. The engine 38ª in this case may be mounted directly above the rotor and drive the rotor through a pinion 35ª, a gear 34ª, and a drive shaft 14ª.

The rotor, instead of having a bracket such as 15, includes a pair of stationary plates 15ª. The upper plate is washer-like and the lower one is a disc, and between them arms 17ª are pivoted. The pivots are shown at 43. The arms 17ª have loop-like extensions 44 on their inner ends which surround a stationary eccentric 45 surrounding the axis of rotation of the rotor. The eccentric 45 may be adjustable as to throw or the pivots 43 may be radially adjustable for the purpose of changing the degree of advance of the vehicle per revolution of the rotor as will be apparent as the description proceeds. By way of example, I have shown the eccentric throw adjustable by slotting it as at 75 to clear the drive shaft 14ª and mounting it by studs 76 and a plate 77 (see Figure 10a). The studs extend through slots 78 of the frame 12ª and the entire assembly of cam, studs and plate 77 is adjusted by rotating a screw 79.

In operation, as the rotor rotates in a counter-clockwise direction in Figure 5, the plane of each disc 27ª will shift from a normal-to-radial position of the arm extending toward the bottom of the drawing, to a plane turned clockwise from normal-to-radial position during one-half of the revolution of the rotor. This is shown by the right hand arm 17ª being at angle A to a line normal to a radius $a$ of the rotor. Reversely, during the other half of the revolution of the rotor, the plane of the disc will shift counter-clockwise from a normal-to-radial position as shown by the left hand disc in Figure 5 and by angle B relative to such line normal to radius $b$. This causes the disc to effect a "spiraling out" during the right half of the revolution and a "spiraling-in" during the left half, thereby causing the vehicle to advance in the direction of arrow C when the rotation is counter-clockwise and the eccentric 45 is offset to the left, the distance of advance during one revolution corresponding to the degree of spiraling both out and in. Obviously, the greater offset there is in the eccentric 45 the greater will be the spiraling action and consequently advance of the vehicle per revolution of the rotor.

In Figure 4 I show a path or tracing accomplished by this action, the three different discs following the paths shown by heavy, light, and dotted lines respectively. The path tracings it will be noted are relatively close so that most of a path, defined by the outer limits of rotation of the rotor, is covered by the discs. In mine sweeping this is an important factor so as to not miss the touch-off element of any mine in the path being cleared. Tank mines can be exploded by a pressure of about 200 pounds anywhere within a foot of the central location of the touch-off element so that a pattern traced as in Figure 4 is sufficient to insure touching off any mine in the entire area covered. The vehicle itself is fabricated of structural steel and the discs of steel plates to resist explosion, and in actual practice the discs 27 and 27ª may be as large as seven feet in diameter. This gives an idea as to the weight involved, and that the vehicle is sufficiently heavy to set off tank mines. They require a pressure of at least 200 pounds to prevent being set off by individuals whereas "anti-personnel" mines require but a very light pressure for setting off purposes.

The form of vehicle shown in Figures 5 and 7 is provided for the purpose of permitting remote control. The frame member 13ª is relatively long and the steerable wheel 41 is provided with a flange 46 which resists side swinging of the frame to thereby permit of the proper traction to cause the rotor to rotate instead of swinging the frame around the rotor when power is applied to the rotor from the prime mover or engine 38ª. Of course where my vehicle is mounted on a tank, truck or the like used to propel it, the propelling vehicle is heavy enough to resist such tendency of the frame 12 to rotate, and the propelling vehicle can be operated to advance the rotor as fast as necessary or desirable with the engine 28 furnishing power only to rotate the rotor and not to cause self-advancement thereof.

The form of vehicle shown in Figures 5 and 7 has the further advantage that it can be remotely controlled as from a truck or jeep following some 50 or 100 yards behind.

For this purpose, the jack 42 may be extended or contracted by the remote control mechanism shown in Figure 8. An actuating portion 47 thereof is mounted on my vehicle, and a control portion 48 thereof is mounted on the trailing vehicle. The portion 47 includes a pump 49 which may be driven from the engine 38ª, a reservoir R and a control valve 50. The valve 50 is a reversing valve for the piston and cylinder of the jack 42 and may be electrically operated as by solenoids 51 and 52. The solenoids are selectively controlled by a single pole, double throw switch 53 so that the wheel 41 may be swung to the right or left as desired, and when the switch 53 is released will stay in its new position until again changed by manual operation of the control switch. In connection with the pump 49 the usual pressure relief valve 54 is illustrated.

For controlling the rotation of the rotor, the engine 38ª may be remotely controlled as by a reversible electric motor 55 hooked up with the butterfly valve 56 of the carburetor. The control panel 48 is provided with a second single pole double throw switch 57 for controlling the direction of rotation of the motor 55, thus speeding up or slowing down the rotor as desired. The wires from the actuating unit 47 to the control panel 48 may be in the form of a cable pulled along the ground by the mine sweeper and connected with the panel in the following vehicle or even controlled by a soldier on foot. The danger of a "booby-trap" type of mine exploding several feet back of its touch-off element is thereby taken care of by the length of control cable instead of the trailing vehicle being mounted closely adjacent the mine sweeper where it could possibly be blown up.

In Figures 9 to 12 I show a modification whereby my type of vehicle may be combined with a road grader or maintainer. The frame 12ᵇ in this instance, is the usual frame of the grader to which the usual grader blade (not shown) may be mounted. The usual steerable wheel 41ᵇ is provided controlled by a steering wheel 58 and the usual engine of the maintainer is shown at 38ᵇ. The rotor in this case is a gear casing 15ᵇ having three axle housings 17ᵇ extending therefrom. All three of the axle housings are pivoted on axes 43ᵇ which in this case are rotating drive shafts. Each drive shaft 43ᵇ is provided with a gear 59 meshing with a main gear 60. The main gear 60 is driven by bevel gears 62 from a shaft 63 connected in any suitable manner with the transmission of the engine 38ᵇ. Thus all three shafts 43ᵇ are driven in the same direction as shown by solid line arrows D in Figure 12. Each shaft 43ᵇ has a bevel gear 64 thereon meshing with another bevel gear 65. The bevel gear 65 is mounted on an axle 66 journaled in the axle housing 17ᵇ and terminating in a wheel 27ᵇ instead of a disc. The wheels may be of the usual rubber-tired variety.

Each axle housing 17ᵇ is provided with a loop-like extension 44ᵇ similar to those shown in Figure 5, which are rotatable and slidable around an eccentric 45ᵇ. The eccentric is stationary by being welded or bolted to the gear housing 15ᵇ and its off-center relation is to the left with respect to the frame 12ᵇ so as to cause advancement in the direction of the steerable wheel 41ʰ. This direction is indicated by the arrow C in Figure 11, being turned ¼ turn in this figure and in Figures 10 and 12 relative to the showing in Figure 9.

One of the axle housings 17ᵇ is part of a sub-gear housing 67 which is eccentrically swingable with relation to the gear housing 15ᵇ as shown in Figures 11 and 12. When the sub-gear housing is swung to the position shown by dotted lines in these two figures, the gear 59 of this particular wheel is removed from mesh with the main gear 60 and meshes with the upper gear 59 in Figure 12. This reverses rotation of the wheel shown by dotted lines in Figure 11, so that both it (as shown by the arrow E) and the right hand wheel then rotate in the same direction for straight-away travel in the direction of arrow C. The entire unit when in this position of adjustment is locked by suitable means (as a pin 70 carried by the frame 12ᵇ and extending into an opening 72 of the gear housing 15ᵇ) in position with the right and left hand axle housing 17ᵇ of Figure 11 in alignment and crosswise of the frame 12ᵇ so that thereafter operation of the engine 38ᵇ will result in ordinary forward movement of the vehicle for grading or road maintaining operations, as distinguished from rotary movement of the rotor thereof for tamping purposes. The upper wheel in Figure 11 is, with this adjustment, removed so that it is out of the way. Thus the rotary tamping feature may be embodied in a single vehicle which serves also for other purposes when it travels in the usual straight-away manner.

For the purpose of adjusting the dotted wheel in Figure 11 to either its dotted or full line position, a hydraulic jack 68 may be provided and controlled in the conventional manner.

From the foregoing specification it will be obvious that I have provided a vehicle which may be effectively used for mine sweeping operations or tamping purposes in either a self-propelled vehicle or in one which may be advanced along the ground surface by another vehicle. The form of invention shown in Figures 1 and 2 may be mounted on a tank or the like and used for mine sweeping operations without interfering with mobility of the tank as the rotor can be released by pulling on the cable 25 if combat becomes necessary during the mine sweeping operations. The discs of Figure 1 may be adjusted to the dotted position so that two of them thus adjusted as in Figure 3 are in a single plane and that plane is parallel to the plane of the third disc. The vehicle may then be drawn or pushed for transportation purposes as distinguished from tamping or mine sweeping purposes with the rotor rotating.

With the form of invention shown in Figures 5 and 7 one of the discs may be adjusted to the position shown diagrammatically in Figure 6, and the lower left disc in this figure elevated as by a chain 69 (see Figure 7) so that the disc adjacent this chain is spaced from the ground surface as shown by dotted lines in this figure. The other two discs then serve as wheels in a straight-away direction so that the vehicle may be towed trailer fashion by hooking onto the left end of the frame member 13ª.

With respect to the pivot 11ª in Figure 7, this permits the rotor to follow the ground contour and the steerable wheel 41 to likewise follow the ground contour without interfering with each other, and eliminates the necessity of the universal joint of Figure 2.

The chains 9 shown in Figure 1, may or may not be provided. Their purpose is to flail the ground as they extend outwardly to the positions shown in Figure 1 due to centrifugal force generated by rotation of the discs 27. They thus extend the effective coverage of the discs for either tamping or mine setting off purposes.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a vehicle, a frame, a rotor thereon for rotation on a vertical axis, said rotor having supporting wheels spaced from the center of rotation and swingable relative to said rotor, means to rotate said rotor and cause said wheels to swing clockwise from a normal-to-radial position during one half of the revolution of the rotor and to swing counter-clockwise from normal-to-radial position during the other half of said revolution for thereby advancing said frame, the degree of advance in relation to the rate of rotation being such as to effect contact of said wheels with the ground surface at successive points substantially less than the distance from the center of rotation of said rotor to said wheels.

2. In a vehicle, a frame, a rotor thereon, said rotor having supporting wheels spaced from the center of rotation, means for rotating said rotor, adjusting means for the planes of said wheels causing the planes to swing clockwise from a normal-to-radial position during one half of the revolution of the rotor and to swing counter-clockwise from normal-to-radial position during the other half of said revolution to effect advancement of said rotor and frame as a result of such rotation of the rotor, said adjusting means and elongated flexible flailing elements connected with said wheels adjacent the peripheries thereof.

3. In a vehicle of the character disclosed, a frame, a rotor thereon having supporting wheels spaced from its center of rotation and adjustable to and from a normal-to-radial position relative to said rotor, means for imparting rotation to said rotor, and means for advancing said frame while the rotor is in rotation comprising adjusting means for the planes of the wheels causing the planes to swing clockwise from a normal-to-radial position during one half of the revolution of the rotor and to swing counter-clockwise from normal-to-radial position during the other half of said revolution.

4. In a vehicle of the kind described, a frame, a rotor thereon having supporting wheels spaced from the center of rotation and adjustable to and from a normal-to-radial position relative to said rotor, means for imparting rotation to said wheels to thereby rotate said rotor, and adjusting means for the planes of said wheels causing the planes to swing clockwise from a normal-to-radial position during one half of the revolution of the rotor and to swing counter-clockwise from normal-to-radial position during the other half of said revolution to effect advancement of said rotor and frame as a result of such rotation of the rotor.

5. A vehicle structure comprising a frame, a rotor thereon for rotation on a substantially vertical axis, said rotor having supporting wheels spaced from the center of rotation, the planes of said wheels being substantially normal-to-radial lines and adjustable from such position, means for imparting rotation to said rotor, and means for continuously adjusting the planes of said wheels out of said normal-to-radial lines positions for causing advance of the vehicle relative to the ground surface.

6. A vehicle of the character disclosed, comprising a frame, a rotor thereon for rotation on a substantially vertical axis, supporting discs for said rotor spaced from its center of rotation the planes of said discs being adjustable from lateral-to-radii positions, means for continuously adjusting the planes of said discs for causing the advance of the vehicle relative to the ground surface while said rotor rotates, and an inverted cone-shaped guard for the center of said rotor and projecting guard toward the ground.

7. In a vehicle of the kind described, a frame, a rotor rotatably supported thereon, thin vertical supporting discs for said rotor spaced from its center of rotation and having axes approximately radially related to the axis of rotation of said rotor, said axes being adjustable from said approximate radial positions and means for rotating said rotor and continuously adjusting the planes of said discs for causing advance of the vehicle relative to the ground surface.

8. In a vehicle of the character disclosed, a frame, a rotor thereon for rotation on a vertical axis, said rotor having supporting wheels spaced from the center of rotation and provided with axes that are adjustable to and from substantially radial positions, means for imparting rotation to said wheels to thereby rotate said rotor, means for advancing said frame while the rotor is in rotation comprising continuously operable adjusting means for the axes of the wheels relative to the rotor, and means for adjusting one of said wheels to a position in a plane parallel to another one thereof and reversing its direction of rotation for propelling said vehicle in a straight-away direction.

9. A vehicle structure comprising a frame having a vertical rotor axis, a rotor for supporting one end of said frame, said rotor having supporting wheels spaced from said rotor axis, the planes of said wheels being changeable relative to radii of said rotor, a steerable wheel for supporting the other end of said frame, said frame comprising two parts pivoted together intermediate the ends of the frame, a prime mover on said frame for rotating said rotor, means for continuously changing the planes of said wheels relative to the radii of said rotor, shifting the planes clockwise in one-half of the revolution of the rotor and counter-clockwise in the other half thereof, and remote control means for said prime mover and said steerable wheel.

10. In a vehicle of the character disclosed, a frame having rotor journaling means, a rotor for supporting one end of said frame, said rotor having supporting wheels spaced from the rotor axis and having their planes changeable relative to radii of said rotor, a steerable wheel for supporting the other end of said frame, a prime mover on said frame for rotating said rotor, means for continuously changing the planes of said wheels relative to the radii of said rotor, shifting the planes clockwise in one-half of the revolution of the rotor and counter-clockwise in the other half thereof for the purpose of effecting advance of said frame and rotor along the ground surface, and remote control means for said prime mover and said steerable wheel.

11. In a vehicle of the character disclosed, a frame having rotor journaling means, a rotor for supporting one end of said frame, said rotor having supporting discs spaced from said rotor axis and having their planes changeable relative to radii of said rotor, a steerable wheel for supporting the other end of said frame, a prime mover on said frame for rotating said rotor, and means for continuously changing the planes of said discs relative to the radii of said rotor, shifting the planes clockwise in one-half of the revolution of the rotor and counter-clockwise in the other half thereof for the purpose of effecting advance of said frame and rotor along the ground surface.

12. In a mine sweeper vehicle, a frame having a vertical rotor axis, a rotor for supporting one end of said frame, said rotor having thin vertical supporting discs spaced from said rotor axis the axes of said discs being changeable relative to radii of said rotor, a steerable wheel for supporting the other end of said frame, a prime mover on said frame for rotating said rotor, and means for continuously changing the planes of said discs relative to the radii of said rotor for effecting advance of said vehicle.

13. In a mine sweeper vehicle, a frame having a vertical rotor axis, a rotor for supporting one end of said frame, said rotor having thin vertical supporting discs spaced from said rotor axis the axes of said discs being changeable relative to radii of said rotor, a steerable wheel for supporting the other end of said frame, a prime mover on said frame for rotating said rotor, means for continuously changing the planes of said discs relative to the radii of said rotor for effecting advance of said vehicle, and remote control means for said prime mover and said steerable wheel.

14. In a vehicle, a frame, a rotor supported by said frame and rotatable relative thereto on a substantially vertical axis, wheels for supporting said frame and thereby said rotor, said wheels being in planes substantially normal to radii of said rotor, an eccentric fixed relative to said frame at the axis of said rotor, arms pivoted to said rotor and having said wheels journaled thereon, said arms engaging said eccentric to be swung on their pivots to thereby effect advance of said vehicle as said rotor rotates.

15. In a mine sweeper vehicle, a frame, a rotor supported by said frame and rotatable relative thereto on a substantially vertical axis, thin discs for supporting said frame and thereby said rotor, said discs being in planes substantially normal to radii of said rotor, off-center means supported in rigid relation on said frame at the axis of said rotor, arms pivoted to said rotor and having said discs journaled thereon, said arms coacting with said off-center means to be swung on their pivots to thereby effect advance of said frame by rotation of said rotor.

16. In a vehicle structure, a frame, a rotor thereon, supporting wheels journaled on said rotor with their axes substantially radial to the rotor and swingable from radial positions, means for advancing said frame by rotating said rotor, said means including mechanism to adjust the planes of the wheels causing the planes to swing clockwise from a normal-to-radial position during one half of the revolution of the rotor and to swing counter-clockwise from normal-to-radial position during the other half of said revolution and means for adjusting one of said wheels to a position parallel to another one thereof for the purpose of transporting said vehicle.

17. A vehicle structure comprising a frame, a rotor thereon for rotation on a vertical axis, said rotor having supporting wheels spaced from the center of rotation and swingable from radial positions relative to said rotor, means for imparting rotation to said wheels to thereby rotate said rotor, means for advancing said frame while the rotor is in rotation comprising adjusting means for the planes of the wheels causing the planes to swing clockwise from a normal-to-radial position during one half of the revolution of the rotor and to swing counter-clockwise from normal-to-radial position during the other half of said revolution, and means for adjusting one of said wheels to a position in a plane parallel to another one thereof and reversing its direction of rotation for propelling said vehicle in a straight-away direction without rotation of said rotor.

18. In a mine sweeper vehicle, a frame having a vertical rotor axis, a rotor for supporting one end of said frame, said rotor having thin vertical supporting discs spaced from said rotor axis, a steerable wheel for supporting the other end of said frame, a prime mover on said frame for rotating said rotor, and means for continuously changing the planes of said discs relative to the radii of said rotor for effecting advance of said vehicle, said means comprising pivoted arms on which said discs are mounted and an eccentric cooperating with said arms to swing them on their pivots, and means for varying the limits of throw of said arms to thereby adjust the degree of advance of said vehicle per revolution of said rotor.

19. In a vehicle, a frame, a rotor rotatable relative to said frame on a substantially vertical axis, wheels for supporting said rotor and said frame, said wheels being in planes substantially normal to radii of said rotor, an eccentric at the axis of said rotor, arms pivoted to said rotor and having said wheels journaled thereon, said arms engaging said eccentric to be swung on their pivots to thereby effect advance of said vehicle as said rotor rotates, and means for adjusting the degree of throw of said arms and thereby the distance said vehicle advances per revolution of said rotor.

ELLSWORTH W. AUSTIN.

REFERENCES CITED

The following references are of record in the file of this patent:

UNITED STATES PATENTS

| Number | Name | Date |
| --- | --- | --- |
| 901,605 | Ferris | Oct. 20, 1908 |
| 2,004,154 | Beatty | June 11, 1935 |

FOREIGN PATENTS

| Number | Country | Date |
| --- | --- | --- |
| 41,497 | Swedish | Oct. 25, 1916 |
| 467,871 | French | Apr. 8, 1914 |